June 26, 1973 W. WEGLIN 3,741,764
METHOD OF MAKING ACCURATE REPRODUCTION
Filed May 21, 1971
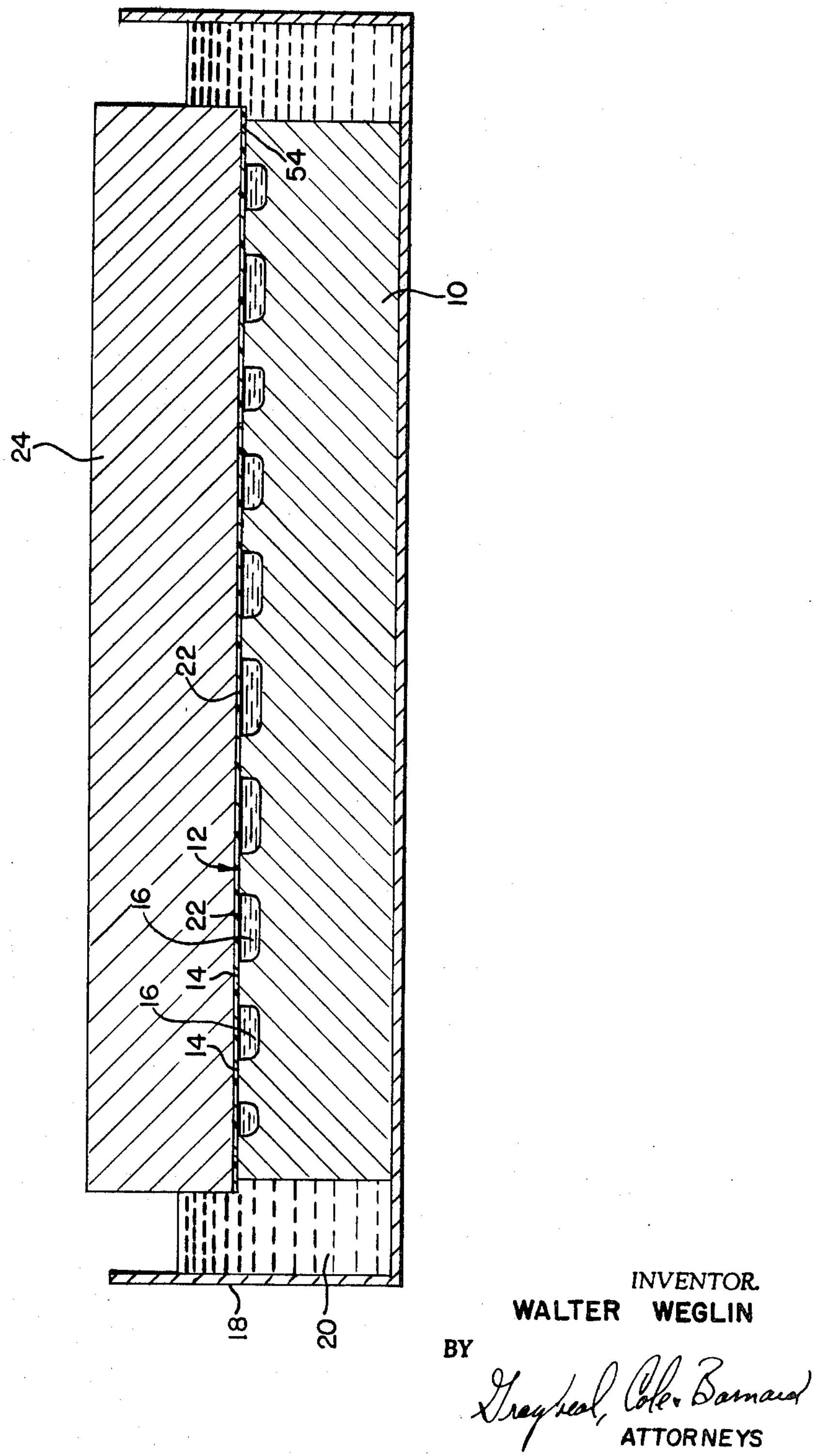
INVENTOR.
WALTER WEGLIN
BY
ATTORNEYS United States Patent Office 3,741,764
Patented June 26, 1973

3,741,764
METHOD OF MAKING ACCURATE REPRODUCTION
Walter Weglin, Seattle, Wash., assignor to Jerobee Industries, Inc., Redmond, Wash.
Filed May 21, 1971, Ser. No. 145,721
Int. Cl. G03c 5/24, 5/00
U.S. Cl. 96—63 9 Claims

ABSTRACT OF THE DISCLOSURE

A method of making an accurate reproduction of a die having raised die elements and adjacent recess areas. The die is immersed in a photographic developing solution, with the die face being disposed upwardly. A fully exposed photographic film is placed into the developing solution and pressed against the die face so that the developing solution is excluded from those areas of the film that press against the die elements. The film is then removed from the developing solution, immediately rinsed in water to remove the developing solution, and then placed in a fix solution to produce a negative that is an accurate reproduction of the raised die elements.

BACKGROUND OF THE INVENTION

(A) Field of the invention

This invention relates to a method of making an accurate reproduction of an object having a raised pattern, such as a die having raised die elements thereon. The present invention is especially adapted for use in making an accurate reproduction of a stamping die, and is disclosed as one of the processing steps in my U.S. patent application entitled, "Method of Making a Die for Stamping Out Circuit Boards," being filed concurrently with the present invention.

(B) Description of the prior art

The usual way of making reproductions in the circuit board art, die making art, etc. is to use conventional photographic processes. One method is to use a camera in a conventional manner to take a picture which is a reproduction. Another method is to lay down an unexposed light sensitive film (e.g. a photo-resist), cover the film with a pattern to be imparted to the film, and then expose this lay-up to a source of light to develop the exposed portions of the film. However, it is difficult to apply either of these methods to making a reproduction of an object such as a stamping die having a raised pattern thereon. Reflected glare makes the picture taking impractical, and the die itself does not have opaque and light transmitting areas to make the second method cited above usable.

In the art of chemical etching it is common practice to apply a protective pattern to the object to be etched, and this is sometimes done by applying a pattern against the object to be etched. This is shown in Coontz, U.S. No. 2,820,312; Bowerman, U.S. No. 2,905,539; and Gillett et al., No. 2,965,952. However, to the best knowledge of the applicant, there has been no teaching of how to make an accurate reproduction of an object, such as a die, having a raised pattern thereon.

SUMMARY OF THE INVENTION

The present invention is directed to making a very accurate reproduction of an object, such as a stamping die, having a raised pattern thereon, comprising one or more raised elements and adjacent recess areas, such as exist in a stamping die. The present invention was made to accomplish a specific processing step in an overall die making process described in my aforementioned copending, concurrently filed U.S. patent application, "Method of Making a Die for Stamping Out Circuit Boards." However, it will be appreciated that my present invention has utility beyond that disclosed in that copending U.S. patent application.

In my present invention the object having the raised pattern thereon (e.g. a die with raised elements) is placed in an activating medium (e.g. a photographic developing solution), this most easily being accomplished by simply immersing the die in the solution with the die face directed upwardly. Then a reactive surface (e.g. an exposed photographic film) is placed in contact with the die face in a manner that it is in intimate contact with the raised element or elements and spaced moderately from the relief area of the die. Thus, those portions of the reactive surface that are matching with the raised elements are not in contact with the activating medium, while those matching with the recess areas are in contact with the activating medium, with the result that the pattern of the raised elements is imparted to the reactive surface.

In the preferred embodiment, where a photographic developing solution and an exposed photographic film are used, the photographic film is removed from the photographic solution and immediately rinsed and placed in a fix solution to form a negative reproduction corresponding to the pattern of the raised elements.

DESCRIPTION OF THE DRAWING

FIG. 1 is a transverse sectional view of apparatus illustrating the method of the present invention.

DESCRIPTION OF THE PREFERRED EMBODIMENT

Numeral 10 designates a die having a die face 12 with a raised pattern, comprising a plurality of individual raised die elements 14, with recesses or cavities 16 therebetween. The elements 14 with the recess areas 16 collectively form a die pattern, with the raised elements 14 being the raised area, and the cavities 16 being the recess area. To make a very accurate reproduction of the pattern area of the die 10, first the die 10 is placed in a container 18 having a conventional photographic solution 20 therein. The solution 20 is of sufficient depth to cover the upwardly disposed die face 12. It is essential that the various cavities 16 of the die face 12 be filled with the developing solution 20. To insure this a syringe filled with the developing solution 20 is used to blow out any occluded air bubbles in the cavities 16. Alternately a vacuum could be applied to cause the air bubbles to be removed.

Next, a fully exposed photographic film 22 is placed against the die face 12. The photographic film 22 is desirably "rolled" onto the die face 12 (somewhat in the manner in which a person would apply a sheet of wallpaper to a wall) to insure that no air bubbles are caught between the film 22 and the die face 12 so that there is intimate contact between the developing solution 20 in the various recesses 16 and the photographic film 22. The emulsion surface (i.e. the reactive surface of the film) is the surface which is pressed against the die face 13. Then a plate 24 is pressed against the film to insure proper contact of the film 22 with the surface portions of the various die elements 14. The film 22 is held in contact for a time sufficient (e.g. 1 minute) to cause the portions of the film in contact with the developing solution 20 to become developed.

Then the film 22 is removed from the developing solution 20 and immediately rinsed in water to remove the developing solution. Then the film is placed in a fix solution for about 2 minutes, and the result is a negative that is an accurate reproduction of the pattern (the pattern of the various die elements 14 and recesses 16 on the die face 12.

EXAMPLE NO. 1

A die block having a plurality of raised flat face die elements was immersed in a photographic developing solution, which was Kodilith developer made by Eastman Kodak Company. Air bubbles were removed from the recess areas of the die face by means of a syringe emitting a stream of the developer solution. A fully exposed photographic film, .004 inch Type 3 Esta base Ortho film by Eastman Kodak Company, was placed against the die face, with the emulsion surface of the film contacting the die face. A plate was pressed against (placed on top of) the film to insure proper contact, and the film remained in the developing solution for 1 minute. The film was removed from the developing solution, rinsed in cold water, and then immediately placed in a photographic fix solution, which was Rapid Fixer made by Eastman Kodak Company. The film was kept in this fixing solution for 2 minutes. This resulted in a negative which was an accurate reproduction of the die pattern.

What is claimed is:

1. A method of making an accurate pattern reproduction of an object having a pattern area comprising a raised area having at least one raised element and an adjacent recess area, said method comprising:

(a) applying to said pattern area an activating medium, (b) placing against said pattern area a reactive surface which is reactive uniformly over said entire surface so as to be responsive to contact with said activating medium in a manner that such contact produces a discernible physical modification in the area of contact, (c) maintaining adequate contact of said reactive surface with said pattern area whereby the raised area of said pattern area is in contact with a matching portion of the reactive surface so as to exclude the activating medium therefrom while permitting contact of the activating medium with that portion of the reactive surface matching with the recess area of the pattern, whereby the recess matching areas of the reactive surface undergo discernible physical modification so as to produce a reproduction of said pattern on the reactive surface.

2. The method as recited in claim 1, wherein said reactive surface is a photographic film.

3. The method as recited in claim 2, wherein said reactive surface is an exposed photographic film.

4. The method as recited in claim 1, wherein said activating medium is a photographic developing solution.

5. The method as recited in claim 4, wherein said reactive surface is a photographic film.

6. The method as recited in claim 5, wherein subsequent to placing said film in the photographic developing solution, said film is placed in a fixing solution.

7. The method as recited in claim 1, wherein said activating medium is a liquid medium, said method being further characterized in that the object is immersed in said liquid medium, and said reactive surface is then placed against said pattern area of the object.

8. The method as recited in claim 7, wherein prior to applying said reactive surface to the pattern area, occluded air bubbles are removed from the recess area by directing a stream of the activating liquid medium into the area.

9. The method as recited in claim 7, wherein prior to applying the reactive surface a vacuum is applied to remove occluded air bubbles.

References Cited

UNITED STATES PATENTS

| | | | |
|---|---|---|---|
| 3,325,285 | 6/1967 | Harris et al. | 96—38 |
| 3,666,479 | 5/1972 | Wiese | 96—38 |
| 3,129,098 | 4/1964 | Kitson | 96—38 |

J. TRAVIS BROWN, Primary Examiner

E. C. KIMLIN, Assistant Examiner

U.S. Cl. X.R.

96—36, 38